(12) United States Patent
Kwon et al.

(10) Patent No.: US 8,819,125 B2  
(45) Date of Patent: Aug. 26, 2014

(54) METHOD OF TRANSMITTING DATA OF USB DEVICE TO SERVER, AND CLIENT TERMINAL PERFORMING THE METHOD

(71) Applicant: Electronics and Telecommunications Research Institute, Daejeon-si (KR)

(72) Inventors: Eun-Jung Kwon, Daejeon-si (KR); Young-Dal Kwon, Seoul (KR); Sang-Hoon Han, Gyeonggi-do (KR); Sun-Jong Kwon, Seoul (KR)

(73) Assignee: Electronics and Telecommunications Research Institute, Dae jeon-si (KR)

( * ) Notice: Subject to any disclaimer, the term of this patent is extended or adjusted under 35 U.S.C. 154(b) by 114 days.

(21) Appl. No.: 13/663,621

(22) Filed: Oct. 30, 2012

(65) Prior Publication Data

US 2013/0254263 A1 Sep. 26, 2013

(30) Foreign Application Priority Data

Mar. 22, 2012 (KR) .................. 10-2012-0029537

(51) Int. Cl.
- *G06F 15/16* (2006.01)
- *H04L 29/02* (2006.01)
- *H04L 29/12* (2006.01)
- *G06F 9/44* (2006.01)

(52) U.S. Cl.  
CPC ............. *H04L 29/02* (2013.01); *H04L 29/12* (2013.01); *G06F 9/4411* (2013.01)  
USPC ......... 709/203; 710/3; 710/5; 710/15; 710/18

(58) Field of Classification Search  
CPC ........ H04L 29/02; H04L 29/12; G06F 9/4411  
USPC .......... 709/203; 710/1, 3, 5, 8, 9, 15, 18, 100, 710/301, 302  
See application file for complete search history.

(56) References Cited

U.S. PATENT DOCUMENTS

| | | | |
|---|---|---|---|
| 6,408,351 B1 * | 6/2002 | Hamdi et al. | 710/63 |
| 7,574,534 B2 * | 8/2009 | Bolan et al. | 710/15 |
| 7,606,951 B2 * | 10/2009 | Woodbridge | 710/36 |
| 7,797,469 B2 * | 9/2010 | O'Keefe et al. | 710/62 |
| 7,912,987 B2 | 3/2011 | Zhong et al. | |
| 2007/0086421 A1 * | 4/2007 | Hong et al. | 370/349 |
| 2007/0226378 A1 * | 9/2007 | O'Keefe et al. | 710/8 |
| 2008/0005370 A1 * | 1/2008 | Bolan et al. | 710/8 |
| 2008/0276009 A1 * | 11/2008 | Mesa et al. | 710/4 |
| 2009/0006676 A1 * | 1/2009 | Sampat et al. | 710/62 |

FOREIGN PATENT DOCUMENTS

KR 1020060083116 A 7/2006

* cited by examiner

*Primary Examiner* — Moustafa M Meky  
(74) *Attorney, Agent, or Firm* — Ladas & Parry LLP (57) ABSTRACT

There is provided a data processing method of a client terminal that communicates with a server, including: receiving a data request message for requesting data of a USB device connected to the client terminal, from the server, the data request message including information about a size of data that is to be read from the USB device; acquiring data corresponding to the size of data included in the data request message, from the USB device; deciding a size of data that is able to be additionally transmitted from the USB device, according to operation states of other USB devices connected to the client terminal; and transmitting a data transmission completion message to the server, wherein the data transmission completion message includes information about the size of data that is able to be additionally transmitted, and the data acquired from the USB device.

11 Claims, 7 Drawing Sheets

METHOD OF TRANSMITTING DATA OF USB DEVICE TO SERVER, AND CLIENT TERMINAL PERFORMING THE METHOD

CROSS-REFERENCE TO RELATED APPLICATION

This application claims the benefit under 35 U.S.C. §119 (a) of Korean Patent Application No. 10-2012-0029537, filed on Mar. 22, 2012, the entire disclosure of which is incorporated herein by reference for all purposes.

BACKGROUND

1. Field

The following description relates to a technique for data transfer in a server-based computing environment, and more particularly, to a method of minimizing a transmission delay time while maintaining a session between a client terminal and a server, when a USB device connected to the client terminal is recognized by the server and data transmission/reception between the USB device and the server is performed.

2. Description of the Related Art

A client terminal can receive the execution results by a resource of a server by connecting to the server through a remote access protocol. In other words, a client terminal receives a screen of displaying the execution results of application programs executed by a server, from the server, through a remote access protocol. At this time, the computing resource of the client terminal is reduced, and accordingly the price of the client terminal is lowered.

Also, in video multi-conferencing, video calling, etc., a client terminal can transmit data received from an external device to a server, and the server can process the received data and transmit a screen including the results of the processing to other client terminals. For data transmission/reception between a server and an external device connected to a client terminal, the server identifies an external device connected to the client terminal, and allocates a logical virtual channel to the identified external device to thereby provide an independent communication method for data transmission/reception. A general remote access protocol classifies virtual channels into static virtual channels and dynamic virtual channels according to their characteristics. The dynamic virtual channels are used when an external device connected to a client through a USB interface is dynamically plugged in or unplugged from the client. When data stored in a USB device is transmitted through a dynamic virtual channel, a bandwidth may be adjusted according to the number of dynamic virtual channels.

There are the case where a server writes data in a USB device (e.g. storage having a file system) connected to a client, the case where a USB device (e.g. a PC camera) connected to a client transmits data to a server, etc. In order to transmit/receive data stored in a USB device connected to a client to/from a server, as a communication protocol for USB device, Remote Desktop Protocol (RDP) Extension has been proposed.

A conventional technology for communication between USB devices and a server is disclosed in Korean Patent Application No. 10-2005-0113510, entitled "USB Devices in Application Server Environments", filed on Nov. 25, 2005, by Microsoft Corporation.

SUMMARY

The following description relates to a method of minimizing a transmission delay time while maintaining a session between a client terminal and a server, when a USB device connected to the client terminal is recognized by the server and data stored in the USB device is transmitted to the server.

In one general aspect, there is provided a data processing method of a client terminal that communicates with a server, including: receiving a data request message for requesting data of a USB device connected to the client terminal, from the server, the data request message including information about a size of data that is to be read from the USB device; acquiring data corresponding to the size of data included in the data request message, from the USB device; deciding a size of data that is able to be additionally transmitted from the USB device, according to operation states of other USB devices connected to the client terminal; and transmitting a data transmission completion message to the server, wherein the data transmission completion message includes information about the size of data that is able to be additionally transmitted, and the data acquired from the USB device.

In another general aspect, there is provided a client terminal including: a USB interface unit connected to a plurality of USB devices; a communication unit configured to communicate with a server; and a controller configured to receive a data request message for requesting data of a USB device among the plurality of USB devices, from the server, the data request message including information about a size of data that is to be read from the USB device, to acquire data corresponding to the size of data included in the data request message, from the USB device, to decide a size of data that is able to be additionally transmitted from the USB device, according to operation states of the other USB devices connected to the client terminal, to generate a data transmission completion message to the server through the communication unit, wherein the data transmission completion message includes information about the size of data that is able to be additionally transmitted and the data acquired from the USB device.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 1:
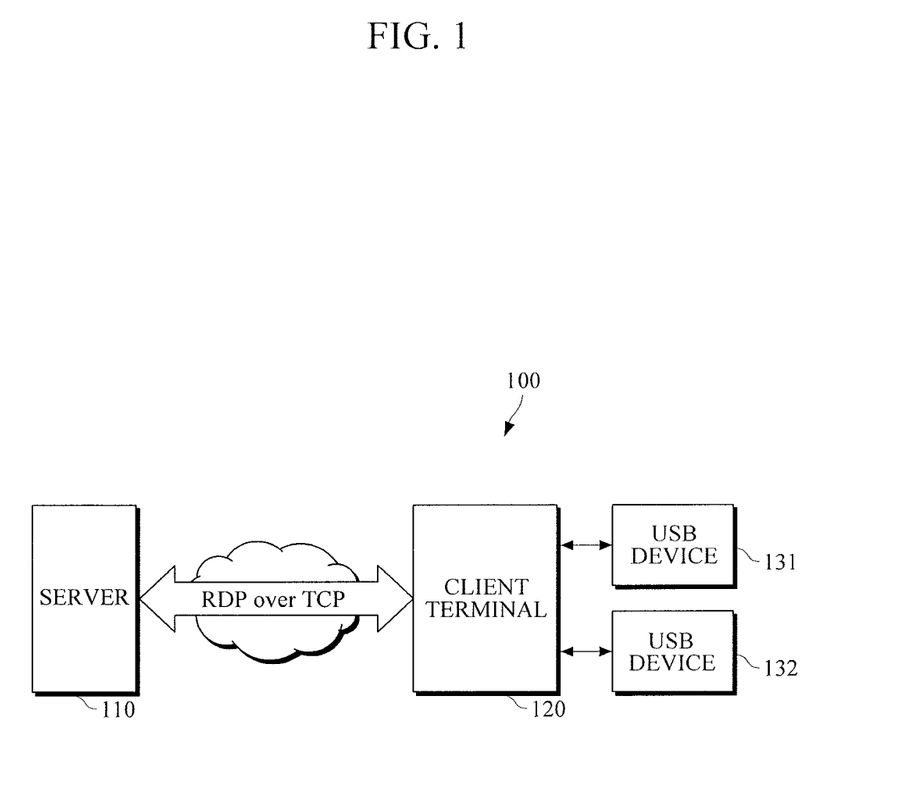
FIG. 1 is a diagram illustrating an example of a system where a server communicates with a client terminal to which USB devices are connected.

FIG. 1 is a diagram illustrating an example of a system 100 where a server 110 communicates with a client terminal 120 to which USB devices 131 and 132 are connected.

Referring to FIG. 1, the system 100 includes the server 110, the client terminal 120, and the USB devices 131 and 132 connected to the client terminal 120.

The client terminal 120 may be a personal computer, a laptop computer, a mobile phone, a smart terminal, etc. FIG. 1 shows the case where the single client terminal 120 communicates with the server 110, however, it is also possible that a plurality of client terminals communicate with the server 110.

The server 110 bidirectionally communicates with the client terminal 120 using a remote transfer protocol such as Remote Desktop Protocol (RDP). The client terminal 120 connects to the server 100 through the RDP, and the server 110 may allocate a session for remote access to the client terminal 120.

The USB devices 131 and 132 are connected to the client terminal 120. The server 110 may be configured to read/write data from/in the USB devices 131 and 132 connected to the client terminal 120. Each of the USB devices 131 and 132 may be a web camera, an external memory, a mouse, a keypad, etc.

Since the server 110 has a structure of allowing connections of a plurality of client terminals, the server 110 increases a session whenever a new client terminal is connected to the server 110. When it allocates a session to the client terminal 120, the server 100 establishes a virtual channel with the client terminal 120 according to the type of data that is to be transmitted to or received from the client terminal 120, and manages a session for the virtual channel.

When the USB devices 131 and 132 are attached to or detached from the client terminal 120, control information, input/output information, and data of the USB devices 131 and 132 are transmitted to the server 110 through the virtual channel. At this time, the server 110 needs to logically classify a plurality of virtual channels to systematically manage them, and the client terminal 120 needs to minimize a delay time when data is transmitted/received between the USB devices 131 and 132 and the server 110.

A communication mechanism about messages transmitted/received between the server 110 and the client terminal 120 to which the USB devices 131 and 132 are connected has been defined in RDP USB Devices Virtual Channel Extension.

When the client terminal 120 connects to the sever 110 using the RDP, the client terminal 120 is allocated a virtual channel, and transmits USB device descriptor information about the USB devices 131 and 132 to the server 110 through the virtual channel, wherein the USB device descriptor information of each of the USB devices 131 and 132 is shared with the server 100 through remote access software installed in the client terminal 120. The USB device descriptor information may include information about the shape of the USB device, such as the number of hubs included in the USB device, information about ports of the USB device, the names of the hubs, a controller name, etc., and information about a device driver of the USB device.

Thereby, the server 110 can read/write data from/in the USB devices 131 and 132 using the USB device descriptor information.

The USB device descriptor information is created in a Universal Request Block (URB) format, and transmitted to the server 110 through Redirector Daemon and/or RDP client software that operates in the client terminal 120. If the USB device descriptor information is transmitted to the server 110 through the RDP client software, data created in the URB format is transmitted through a RDP virtual channel, and if the USB device descriptor information is transmitted to the server 110 through the Redirector Daemon, data created in the URB format is transmitted through communication with a TCP/IP socket.

There are two methods in which upstream data is transmitted from the client terminal 120 to the server 110. The first method is to transmit, when upstream data generates a large amount of traffic, data of the USB devices 131 and 132 directly to the server 110 through Redirect Daemon having less data overhead (because of including no RDP header). The second method is to transmit data of the USB devices 131 and 132 through Redirect Daemon and RDP client software in this order, to the server 110. In the second method, since an RDP client processes all upstream (client→server) and downstream (server→client) data, the server 100 can easily identify USB devices for each RDP session. However, when a large amount of upstream traffic is generated, performance deterioration may occur.

According to an example, when a large amount of upstream data traffic is generated, the method of transmitting data of USB devices directly to a server through Redirect Daemon may be preferentially used. Alternatively, the method of transmitting data of USB devices through Redirect Daemon and RDP client software in this order to a server is used.

Figure 2:
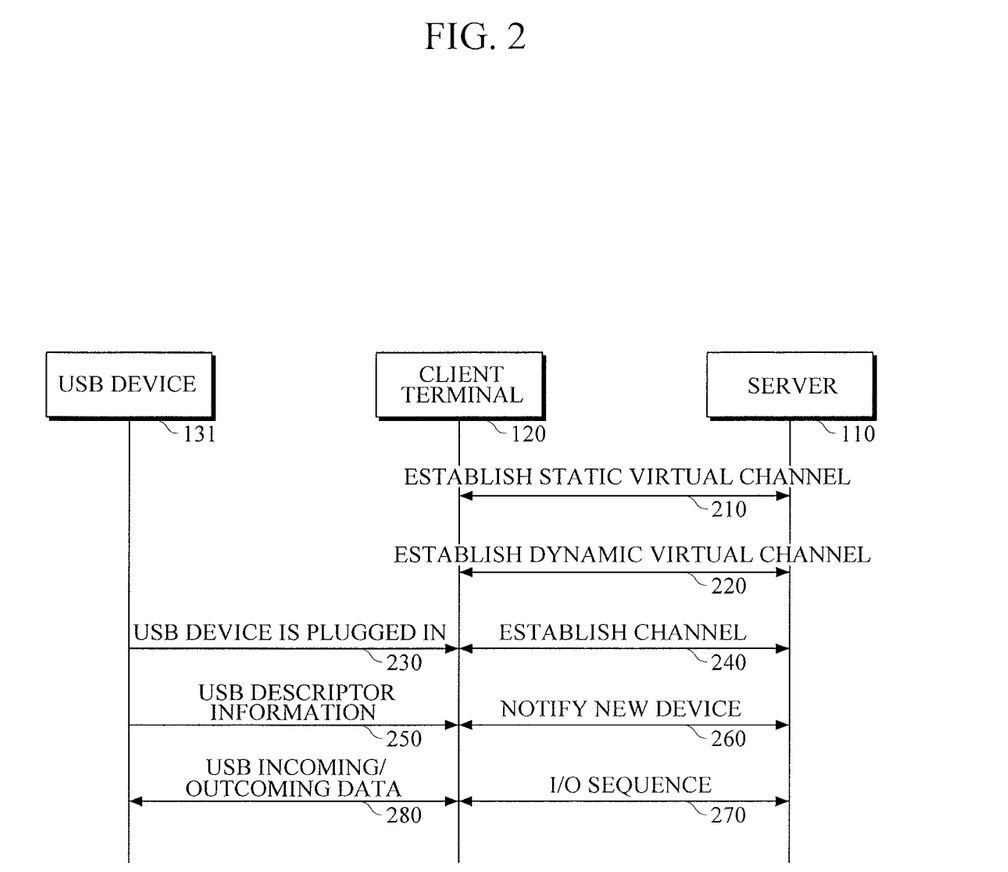
FIG. 2 is a flowchart illustrating an example of a communication process between a server, a client terminal, and USB devices.

FIG. 2 is a flowchart illustrating an example of a communication process between the server 110, the client terminal 120, and the USB device 131.

Referring to FIG. 2, if the client terminal 120 is connected to the server 110, a static virtual channel is established (210). Through the static virtual channel, a general client/server relationship between the client terminal 120 and the server 110 is made. When the static virtual channel is established, there is the case where the client terminal 120 can provide a dynamic virtual channel by exchanging supportable parameter values with the server 110. In this case, between the client terminal 120 and the server 110, a dynamic virtual channel having a channel ID, a channel name, etc. is established (220).

At this time, if the USB device 131 is plugged in the client terminal 120 or if the client terminal 120 already has the USB device 131 plugged therein (230), the client terminal 120 consults with the server 110 about which dynamic virtual channel has to be used to process data of the USB device 131. The server 110 establishes a channel with the client terminal 120 according to the result of the consultation, and notifies the result of the channel establishment to the client terminal 120 (240).

Then, the client terminal 120 acquires device descriptor information of the USB device 131 from the USB device 131 (250), and transmits the device descriptor information to the server 110 (260). In operation 260, an Add Device Channel message ADD_VIRTUAL_CHANNEL and an Add Device message ADD_DEVICE are transmitted from the client terminal 120 to the server 110.

Thereby, the server 110 can process an input/output sequence, such as reading/writing data from/in the USB device 131 (270), and the client terminal 120 can read/write data from/in the USB device 131 according to the input/output sequence with the server 110 (280).

In order for the server 110 to acquire data stored in the USB device 131 connected to the client terminal 120, the server 110 transmits a data request message for requesting data stored in the USB device 131 to the client terminal 120, wherein the data request message includes information regarding the size of data that is to be read from the USB device 131. The data request message is referred to as a Transfer In Request message. Also, in order for the server 110 to write data in the USB device 131 connected to the client terminal 120, the server 110 may transmit a Transfer Out Request message to the client terminal 120. Since the server 110 acquires and manages device descriptor information while establishing virtual channels in order to use virtual USB devices, the server 110 may include information about an output buffer size in the Transfer In Request message. The information about the output buffer size represents the size of data that is requested to be read from the USB device 131 and then transferred to the server 110 through the dynamic virtual channel established for the USB device 131.

When the dynamic virtual channel is established (220), the server 110 transmits a Dynamic VC Create Request PDU message to the client terminal 120, wherein the Dynamic VC Create Request PDU message includes version information (Version 1 or Version 2) of a virtual channel supportable by the server 100, a channel number, a command code value, a priority class value defined for the dynamic virtual channel, etc. In the current example, four priority class values are defined, and each priority class value represents the size of a bandwidth to be allocated to the corresponding virtual channel. As such, a priority class value which represents the size of a bandwidth to be allocated for data transmission of the USB device 131 is included in the Transfer In Request message and transmitted to the client terminal 120.

For example, the server 110 may define four priority class values PriorityCharge0 PriorityCharage1, PriorityCharage2, and PriorityCharge3, and allocate a bandwidth according to a priority class value of the USB device 131 connected to the client terminal 120 based on a bandwidth allocation algorithm. The priority class values related to use of bandwidth can be shared between the server 100 and the client terminal 120, and the server 110 transmits a priority class value for the corresponding dynamic virtual channel to the client terminal 120, thereby setting an available bandwidth for the corresponding dynamic virtual channel.

Generally, since bandwidths corresponding to the four priority class values are fixed, a USB device cannot use a bandwidth allocated to another USB device although the other USB device does not use its own bandwidth.

For example, if the USB device 131 connected to the client terminal 120 is a UBS web camera and 50% of a bandwidth has been reserved for the USB web camera 131, another USB device (for example, 132 of FIG. 1) can use only the remaining 50% regardless of whether or not the web camera 131 uses its own bandwidth to transmit data. However, generally, since the USB web camera 131 is always plugged in a USB port although the USB web camera 131 uses its own bandwidth only when transmitting image data, and the bandwidth allocated to the USB web camera 131 cannot be used by other USB devices, use of bandwidth is inefficient. For example, if the client terminal 120 is connected to a USB web camera and another USB device for receiving and transmitting bulk data requiring accuracy, data processing is delayed since the two USB devices use the same bandwidth allocated for real-time data transmission.

Meanwhile, when data stored in the USB device 131 is transmitted/received between the client terminal 120 and the server 110 through a virtual channel, if control information used for transmitting/receiving the data of the USB device 131 are different from control information used upon actual transmission of data, the virtual channel is terminated and virtual channel initialization is performed. The control information may include dynamic virtual channel setting information, information generated upon message processing for data transmission, etc. Such virtual channel initialization also results in an increase in service delay time.

According to an example, the server 110 and the client terminal 120 may control a bandwidth when data of the USB device 131 is transmitted through a dynamic virtual channel. For example, when real-time data such as captured images and bulk data not requiring high accuracy are transmitted, a bandwidth for USB data transmission may be allocated according to the size of data to be transmitted since it is important to transmit the data in a predetermined time.

Figure 3:
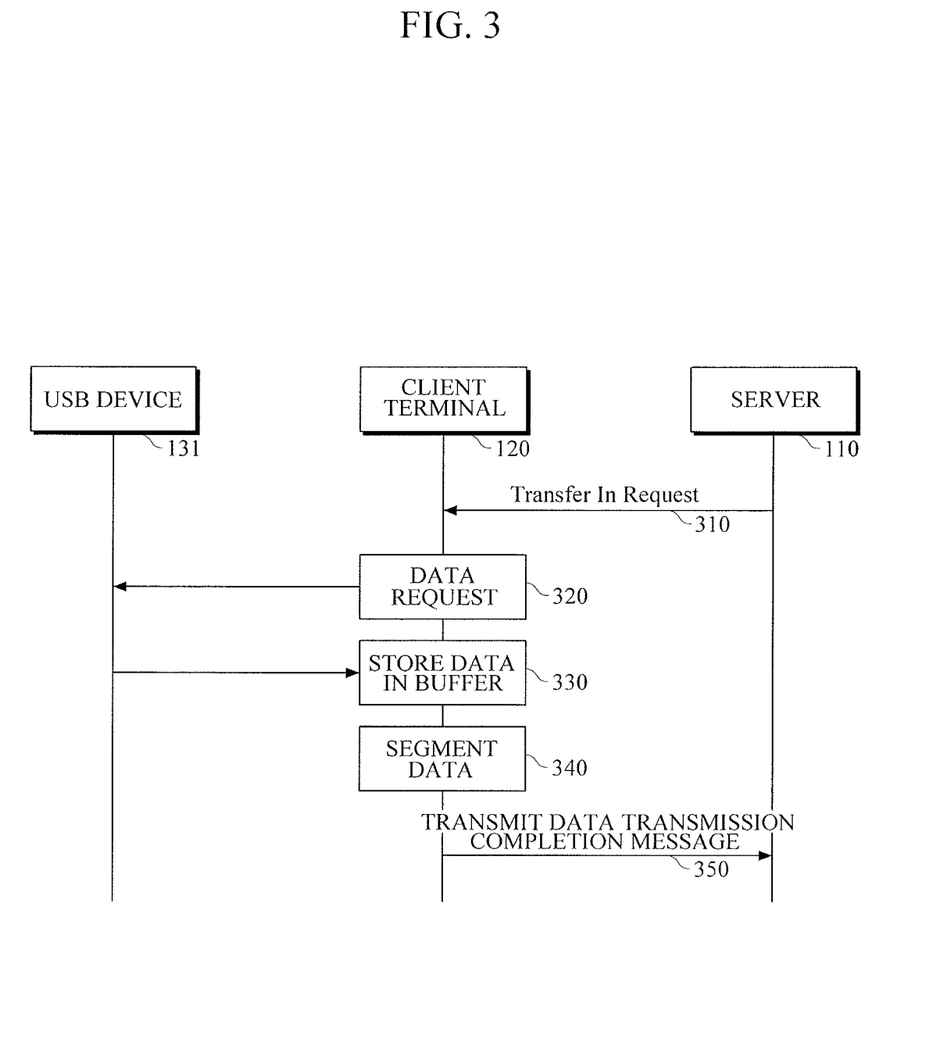
FIG. 3 is a flowchart illustrating an example of a process in which a server acquires data from a USB device connected to a client terminal.

FIG. 3 is a flowchart illustrating an example of a process in which the server 110 acquires data from the USB device 131 connected to the client terminal 120.

As described above with reference to FIG. 2, first, the server 110 establishes a virtual channel in order to use the USB device 131 connected to the client terminal 120, and transmits an I/O control command to the client terminal 120 to acquire device descriptor information of the USB device 131 from the client terminal 120.

Thereby, the server 110 can receive/transmit data from/to the USB device 131 connected to the client terminal 120. In order for the server 110 to acquire data of the USB device 131, the server 110 transmits a Transfer In Request message to the client terminal 120 (310). At this time, the server 110 may set information about an output buffer size of the client terminal 120 based on the device descriptor information and include the information about the output buffer size in the Transfer In Request message in order to receive bulk data from the client terminal 120.

If the USB device 131 is a USB web camera, the server 110 may include Isochronous Transfer information in the header of the Transfer In Request message, wherein the Isochronous Transfer information requires a predetermined transmission rate and allows a predetermined amount of error. The Isochronous Transfer information includes information (that is, information regarding the number of interfaces, information regarding the number of pipes for data transmission, information for requesting information about each pipe, etc.) about an interface of the USB device 131 (to drafter: please check this sentence)

The client terminal 120 allocates a buffer corresponding to the output buffer size included in the Transfer In Request message to an internal memory (not shown), and requests the USB device 131 to send an amount of data corresponding to the output buffer size among data stored in the USB device 131, through a USB device driver (not shown) (320). Then, the client terminal 120 stores the data received from the USB device 131 in response to the request in the allocated buffer of the client terminal 120.

At this time, if the size of the data stored in the buffer is equal to or greater than a predetermined size (for example, 1,600 bytes) or if the size of the data stored in the buffer is greater than the size of data that is to be transmitted through the virtual channel, the data may be segmented (340). The operation 340 of segmenting data is selectively performed.

Then, the client terminal 120 packetizes the data received from the USB device 131 to create a data transmission completion message and transmits the data transmission completion message to the server 120 (350). If the server 120 has received segmented data through the data transmission completion message, the server 120 may re-assemble the received data.

As such, the client terminal 120 may receive a Transfer In Request message from the server 120, interpret the Transfer In Request message, and transmit data output from a USB web camera connected to the client terminal 120 according to a data size required by the server 110, to the server 110.

Figure 4:
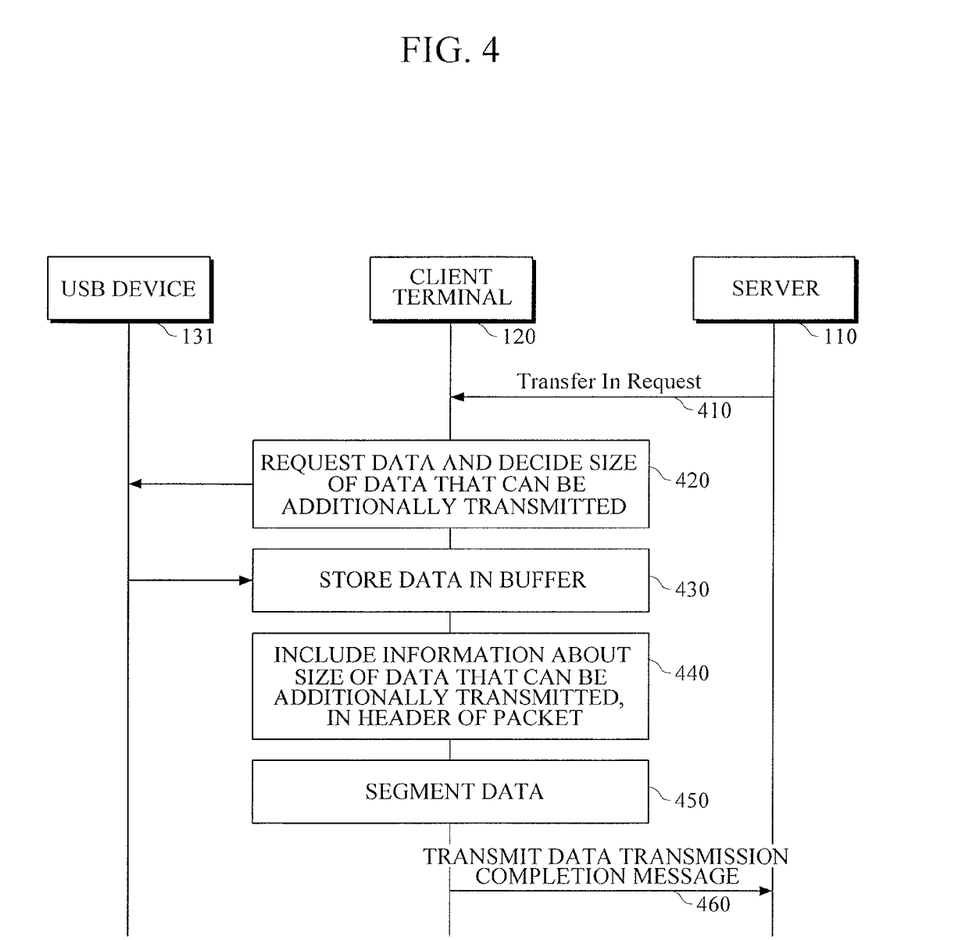
FIG. 4 is a flowchart illustrating another example of a process in which a server acquires data from a USB device connected to a client terminal.

FIG. 4 is a flowchart illustrating another example of a process in which the server 110 acquires data from the USB device 131 connected to the client terminal 120.

Referring to FIG. 4, the server 110 transfers a Transfer In Request message to the client terminal 120 (410). The Transfer In Request message includes information about an output buffer size corresponding to the size of data that is to be read from the USB device 131.

The client terminal 120 receives the Transfer In Request message, allocates a buffer corresponding to the output buffer size included in the Transfer In Request message to an internal memory, and requests the USB device 131 to send data (420). Simultaneously, the client terminal 120 decides a size of data that can be additionally transmitted, according to the operation states of other USB devices connected to the client terminal 120 (420).

Also, the client terminal 120 stores data acquired from the USB device 131 in the allocated buffer (430).

The client terminal 120 includes information about the decided size of data that can be additionally transmitted, in the header of a data transmission completion message that is to be transmitted to the server 110 (440). The client terminal 120 may transmit the data transmission completion message including the data acquired from the USB device 131 and the information about the size of data that can be additionally transmitted, to the server 110 (460). The data transmission completion message may be a URB completion message that is transmitted to the server 120 in response to the Transfer In Request message.

Meanwhile, if a size of total data that has to be transmitted to the server 110 is greater than a size of data that can be transmitted through an established dynamic virtual channel, the client terminal 120 may segment the data that is to be transmitted (450), packetize the segmented data, and transmit the resultant packets to the server 110 (460).

Thereafter, when the server 110 transmits another Transfer In Request message for requesting data of the USB device 131 to the client terminal 120, the server 110 may again decide an output buffer size based on the information about the size of data that can be additionally transmitted, and include information about the decided output buffer size in the Transfer In Request message. Then, the server 110 can read an amount of data corresponding to the changed output buffer size from the USB device 131, thereby minimizing a time delay occurring when the data read from the USB device 131 is transmitted from the client terminal 120 to the server 110.

Figure 5:
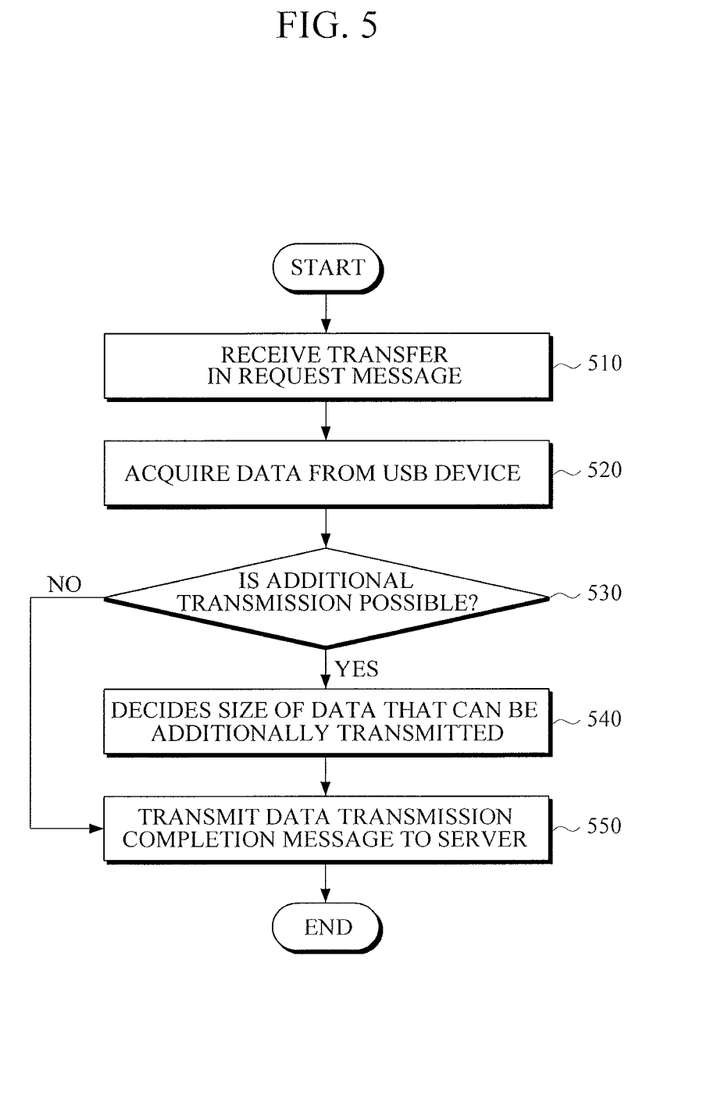
FIG. 5 is a flowchart illustrating an example of a method in which a client terminal processes data.

FIG. 5 is a flowchart illustrating an example of a method in which the client terminal 120 processes data of the USB device 131, which is to be transmitted through a virtual channel.

Referring to FIGS. 1 and 5, the client terminal 120 receives a Transfer In Request message from the server 110 (510).

The client terminal 120 interprets the Transfer In Request message, and acquires an amount of data corresponding to a buffer size included in the Transfer In Request message, from the USB device 131 (520).

If a plurality of USB devices including the USB device 131 have been connected to the client terminal 120, the client terminal 120 checks the occupied state of a bandwidth allocated to each USB device, and recognize the operation states of the USB devices that are managed by the client terminal 120 in order to efficiently use the bandwidths of the USB devices. For example, if a USB web camera connected to the client terminal 120 is not used, the client terminal 120 may re-calculate a priority class value allocated to the corresponding dynamic virtual channel to thereby change information of the dynamic virtual channel.

In order to reduce a communication delay time between the server 110 and the client terminal 120, the client terminal 120 checks the size of data stored in the memory of the USB device 131 to determine whether additional transmission is possible (530). If additional transmission is possible, the client terminal 120 decides a size of data that can be additionally transmitted (540). At this time, the client terminal 120 may decide a bandwidth for data transmission using the re-calculated priority class value, and decide a size of data that can be additionally read from the USB device 131 and transmitted to the server 110, according to the decided bandwidth.

Then, the client terminal 120 transmits a data transmission completion message including information about a size of data that can be additionally transmitted and data acquired from the USB device 131, to the server 110 (550).

The server 110 which has received the data transmission completion message may decide an output buffer size corresponding to a size of data that is requested to be additionally transmitted, in consideration of the information about the size of data that can be additionally transmitted, included in the header of the data transmission completion message, include information about the output buffer size in a Transfer In Request message, and transmit the Transfer In Request message to the client terminal 120. Therefore, the server 110 may acquire a large amount of data from the client terminal 120, and fast data transmission between the server 110 and the client terminal 120 is achieved in an allocated bandwidth, which leads to a reduction of transmission delay.

Figure 6:
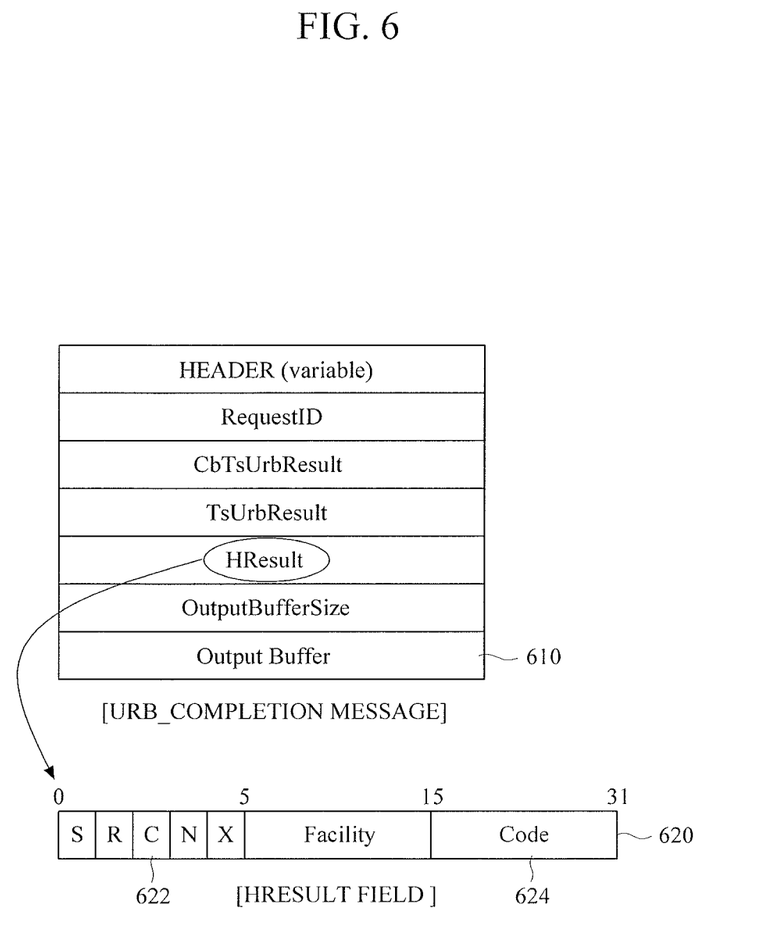
FIG. 6 shows an example of a data transmission completion message.

FIG. 6 shows an example of a data transmission completion message.

Referring to FIG. 1, the client terminal 120 which has received a Transfer In Request message transmits a data transmission completion message to the server 110 in order to transmit data stored in a buffer to the server 110. The data transmission completion message may be a URB completion message 610 in a format shown in FIG. 6.

The URB completion message 610 includes a header for USB remote processing and a RequestID value corresponding to the Transfer ID Request message received from the server 110, and also includes data stored in a buffer, which is to be transmitted to the server 110.

In order to reduce a delay time upon data processing between the server 110 and the client terminal 120, if a specific value (for example, "1") is written in a "C" area 622 of a HResult field 620 of the URB completion message, information about a size of data that can be additionally transmitted may be included in a Code area 624 of the HResult field 620.

The Code area 624 is allocated 2 bytes, wherein the upper 1 bit of the 2 bytes may store a value indicating that a Transfer in Request to be received in response to the URB completion message has to request additional data transmission, and the lower 15 bits may store a value representing a size of data that is requested to be additionally transmitted. However, the format of the data transmission completion message 610 as shown in FIG. 6 is only exemplary, and other methods allowing a server to remotely use USB devices can be arbitrarily defined and used within a predetermined remote-control specification.

Figure 7:
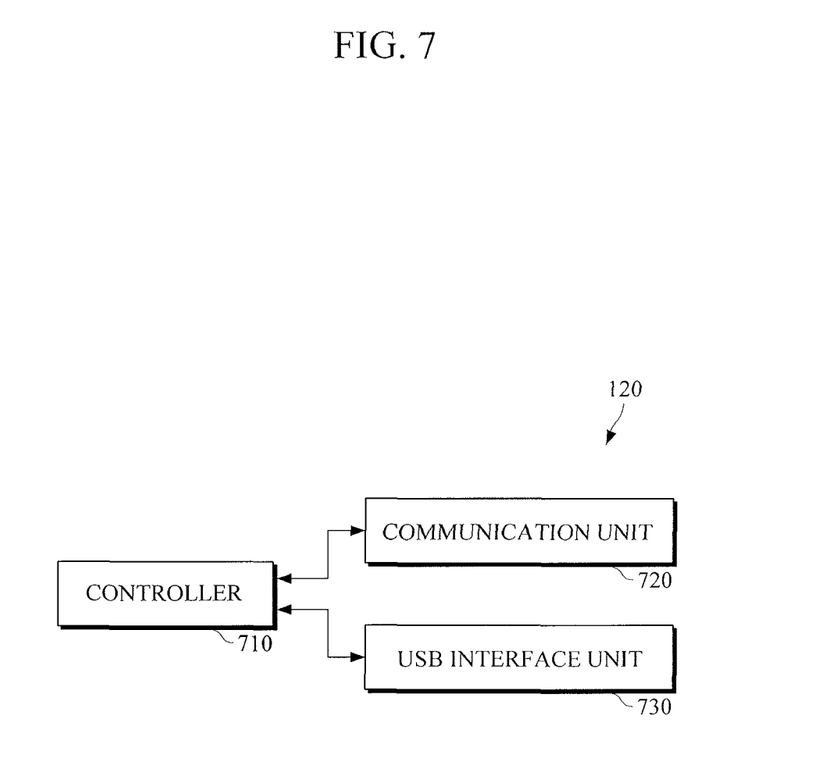
FIG. 7 is a diagram illustrating an example of a client terminal.

FIG. 7 is a diagram illustrating an example of the client terminal 120.

Referring to FIG. 7, the client terminal 120 may include a controller 710, a communication unit 720, and a USB interface unit 730.

The controller 710 may be configured to control the entire operation of the client terminal 120. The controller 710 may communicate with the server 110 according to a remote access protocol. For this, a remote access protocol, such as RDP client software and/or Redirect Daemon, may be installed in the controller 710.

The communication unit 720 communicates with the server 110 (see FIG. 1) that provides a remote access service.

The USB interface unit 730 includes a plurality of USB interfaces (not shown). USB devices, such as a web camera, an external memory, a mouse, a keypad, etc., can be connected to the individual USB interfaces.

If the controller 710 receives a data request message for requesting data of a USB device connected to the client terminal 120 from the server 110, the controller 710 may acquire information about an output buffer size included in the data request message, read data corresponding to the output buffer size from the USB device, and decide a size of data that can be additionally transmitted.

At this time, the controller 710 may recognize the operation states of USB devices connected to the individual USB interfaces of the USB interface unit 730, re-calculate, if one of the USB devices is not used, a priority class value allocated to the corresponding dynamic virtual channel, decide a bandwidth for data transmission according to the re-calculated priority class value, and decide a size of data that can be additionally transmitted from the USB device, according to the decided bandwidth.

Then, the controller 710 generates a data transmission completion message including information about the size of data that can be additionally transmitted, and data acquired from the USB device, and transmits the data transmission completion message to the server 110 through the communication unit 720. The data transmission completion message may be a URB completion message, and the information about the size of data that can be additionally transmitted may be included in a HResult field of the URB completion message. If a specific value is written in a "C" area of the HResult field of the URB completion message, the information about the size of data that can be additionally transmitted may be included in a Code area of the HResult field. The upper 1 bit of the Code area may store a value indicating that a Transfer in Request to be received in response to the URB completion message has to request additional data transmission, and the lower 15 bits thereof may store a value representing a size of data that is requested to be additionally transmitted.

Therefore, according to the examples described above, by recognizing the operation states of USB devices connected to a client terminal in real time to change a bandwidth allocated to a dynamic virtual channel according to the operation states of the USB devices and cause the client terminal to inform a server of information about a size of data that can be additionally transmitted through the changed bandwidth, efficient data processing through USB devices upon remote data transmission can be achieved.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data processing method of a client terminal that communicates with a server, comprising:
   receiving a data request message for requesting data of a USB device connected to the client terminal, from the server, the data request message including information about a size of data that is to be read from the USB device;
   acquiring data corresponding to the size of data included in the data request message, from the USB device;
   deciding a size of data that is able to be additionally transmitted from the USB device, according to operation states of other USB devices connected to the client terminal; and
   transmitting a data transmission completion message to the server, wherein the data transmission completion message includes information about the size of data that is able to be additionally transmitted, and the data acquired from the USB device.

2. The data processing method of claim 1, wherein the deciding of the size of data that is able to be additionally transmitted comprises:
   recognizing operation states of a plurality of USB devices that are managed by the client terminal;
   re-calculating, if at least one USB device of the plurality of USB devices does not operate, a priority class value allocated to a dynamic virtual channel for the USB device, and deciding a bandwidth for transmission of data to be read from each of the rest USB devices that operate, according to the re-calculated priority class value; and
   deciding the size of data that is able to be additionally transmitted, according to the decided bandwidth.

3. The data processing method of claim 1, wherein the data request message is a Transfer In Request message.

4. The data processing method of claim 1, wherein the data transmission completion message is a URB completion message, and information about the size of data that is able to be additionally transmitted is included in a HResult field of the URB completion message.

5. The data processing method of claim 4, wherein if a specific value is written in a "C" area of the HResult field of the URB completion message, the information about the size of data that is able to be additionally transmitted is included in a Code area of the HResult field.

6. The data processing method of claim 4, wherein the upper 1 bit of the Code area stores a value indicating that a Transfer in Request to be received in response to the URB completion message has to request additional data transmission, and the lower 15 bits of the Code area store a value representing a size of data that is requested to be additionally transmitted.

7. A client terminal comprising:
   a USB interface unit connected to a plurality of USB devices;
   a communication unit configured to communicate with a server; and
   a controller configured to receive a data request message for requesting data of a USB device among the plurality of USB devices, from the server, the data request message including information about a size of data that is to be read from the USB device, to acquire data corresponding to the size of data included in the data request message, from the USB device, to decide a size of data that is able to be additionally transmitted from the USB device, according to operation states of the other USB devices connected to the client terminal, to generate a data transmission completion message to the server through the communication unit, wherein the data transmission completion message includes information about the size of data that is able to be additionally transmitted and the data acquired from the USB device.

8. The client terminal of claim 7, wherein the controller recognizes the operation states of the plurality of USB devices connected to the USB interface unit, re-calculates, if at least one USB device of the USB devices does not operate, a priority class value allocated to a dynamic virtual channel for the USB device, decides a bandwidth for transmission of data to be read from the USB device that does not operate, according to the re-calculated priority class value, and decides the size of data that is able to be additionally transmitted, according to the decided bandwidth.

9. The client terminal of claim 7, wherein the data transmission completion message is a URB completion message, and information about the size of data that is able to be additionally transmitted is included in a HResult field of the URB completion message.

10. The client terminal of claim 9, wherein if a specific value is written in a "C" area of the HResult field of the URB completion message, the information about the size of data that is able to be additionally transmitted is included in a Code area of the HResult field.

11. The client terminal of claim 10, wherein the upper 1 bit of the Code area stores a value indicating that a Transfer in Request to be received in response to the URB completion message has to request additional data transmission, and the lower 15 bits of the Code area store a value representing the size of data that is requested to be additionally transmitted.

* * * * *